United States Patent [19]
Sherman

[11] Patent Number: 5,797,581
[45] Date of Patent: Aug. 25, 1998

[54] APPARATUS FOR POSITIONING AND MOUNTING FIXTURES

[76] Inventor: Norman Sherman, 22 Caribou Road, Toronto, Ontario, Canada, M5N 2A3

[21] Appl. No.: 516,085

[22] Filed: Aug. 17, 1995

[51] Int. Cl.⁶ .................................................. F16M 13/00
[52] U.S. Cl. ........................ 248/544; 411/957; 411/959; 411/112; 411/113; 248/546; 248/205.1
[58] Field of Search ...................... 248/544, 546, 248/205.1; 411/84, 85, 111, 112, 113, 160, 549, 552, 553

[56] References Cited

U.S. PATENT DOCUMENTS

| | | | |
|---|---|---|---|
| 779,751 | 1/1905 | Waitt | 411/957 X |
| 1,031,970 | 7/1912 | Stockford | 411/957 X |
| 2,330,372 | 11/1943 | Mittendorf | 411/112 |
| 2,394,491 | 7/1946 | Schaper | 411/113 |
| 2,741,289 | 4/1956 | Grow | 411/959 X |
| 3,171,518 | 3/1965 | Bergmann | 411/957 X |
| 3,180,203 | 4/1965 | Vaughn | 411/959 X |
| 5,090,855 | 2/1992 | Terry | 411/144 |

*Primary Examiner*—Alvin C. Chin-Shue
*Assistant Examiner*—Long Dinh Phan
*Attorney, Agent, or Firm*—Chadbourne & Parke LLP

[57] ABSTRACT

An apparatus for positioning and mounting fixtures is described. At least one ring for fitted insertion into a fixture to be mounted is provided. A disc having an opening for receiving a fastening device is provided for each ring. The fastening device is installed through the opening in the disc, then aligned through the ring in the fixture with a pre-drilled hole in the mounting surface, and loosely tightened into the pre-drilled hole. The fixture is then aligned to a desired position relative to the mounting surface, and the fastening device is tightened such that the underside of the disc fixedly engages the ring and the fixture to the mounting surface.

21 Claims, 6 Drawing Sheets

APPARATUS FOR POSITIONING AND MOUNTING FIXTURES

FIELD OF THE INVENTION

The present invention relates to an apparatus that permits the position of a fixture to be adjusted relative to a mounting surface without drilling new holes in the mounting surface.

BACKGROUND INFORMATION

The widespread use of screws to mount fixtures on a surface is well known. Once the location of the first hole to be drilled in the surface is chosen, the location of the second hole is determined by measuring the separation between holes on the fixture and ensuring that the same separation exists between the first hole on the mounting surface and the second. Because the holes for the screws are generally the same size as the screws themselves, there is very little, if any, tolerance for imprecise measurements. If the holes that have been drilled in the mounting surface do not align with the holes in the fixture, another hole must be drilled in the mounting surface to account for the imprecise measurement, resulting in unnecessary damage to the mounting surface. Even if only one hole is required, the fixture will not be adjustable relative to the mounting surface unless another hole is drilled.

There is a need for an apparatus that would permit the fixture to be adjusted relative to the mounting surface without having to drill a new hole or holes in the mounting surface.

SUMMARY OF THE INVENTION

The present invention satisfies this need by providing an apparatus with a built-in tolerance for imprecise measurements that is easy to manufacture and simple to incorporate into existing fixtures such as brackets, hinges and frames. The result is that the fixture can be affixed to a mounting surface on which the drilled holes have been imprecisely or unevenly spaced, thus obviating the need to drill additional holes to account for the imprecise measurement.

The apparatus includes at least one ring. Each ring has a center opening for receiving a fastening device such as a screw, and may have an upper convex or domed surface and a lower flat surface. Slots the same shape and size as each ring are cut into the fixture, or a fixture with pre-cut slots is provided, and a ring is inserted into each slot. An equal number of discs having a lower surface area greater than that of the slot into which the disc is inserted in the mounting fixture, and having a hole for receiving a fastening device, are provided. The underside of the disc may be conditioned for gripping the ring and the fixture. The fastening device is inserted into the center opening of a disc, then aligned through the opening in a ring with a pre-drilled hole in the mounting surface and loosely tightened into the pre-drilled hole. Once the fixture has been adjusted to its desired position relative to the mounting surface, each fastening device are tightened such that the underside of the disc fixedly engages the upper surface of the ring that is raised above the plane of the mounting fixture and the fixture, thereby securing the mounting fixture to the mounting surface.

The tolerance of the apparatus can be adjusted and depends upon the relative size of the openings in the rings. The greatest dimension of the center opening of the ring is the maximum distance that the fixture may be adjusted relative to the mounting surface.

DETAILED DESCRIPTION

Figure 1:
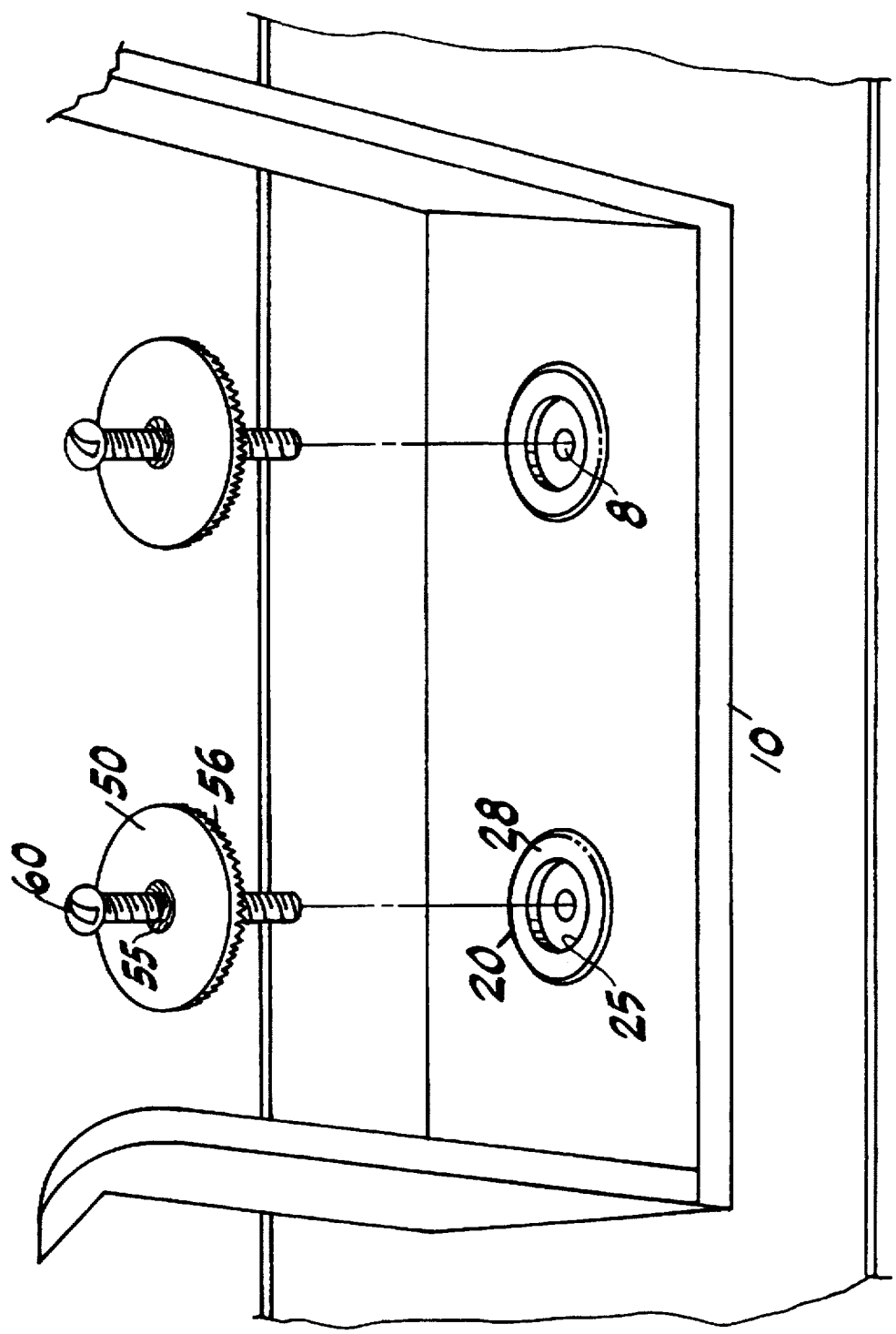
FIG. 1 is an overhead view of an embodiment of the apparatus for securing the fixture constructed according to the principles of the present invention.
Figure 2:
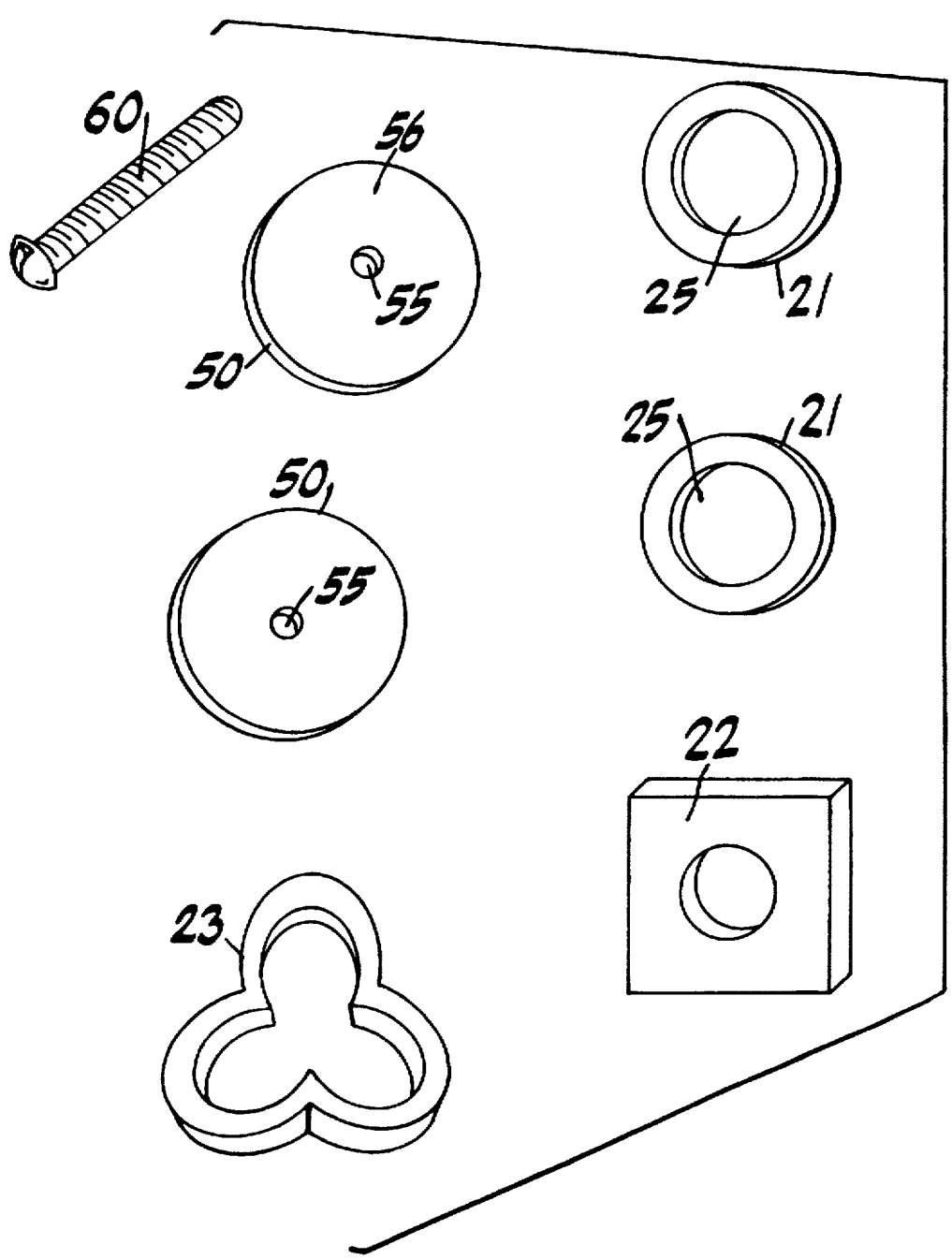
FIG. 2 is an overhead of various embodiments of rings and discs in the apparatus of FIG. 1.

As illustrated in FIG. 1, in the preferred embodiment of the present invention, the apparatus for positioning and mounting fixtures consists of two rings 20 incorporated into a fixture 10 to be mounted on a mounting surface, and two discs 50 having a central opening 55 for receiving a fastening device such as a screw 60 and having a conditioned underside surface 56 for securing the discs 50 to each ring 20 and the fixture 10. Each ring 20 may be any circumscribed shape, including a circle 21, square 22 or clover 23, as illustrated in FIG. 2. The upper surface 28 of the ring 20 may be slightly curved and raised above the plane of the mounting fixture 10 for improved gripping of the conditioned underside surface 56 of the disc 50. Each ring 20 may be made from any solid material such as metal or plastic, and each disc 50 may be made from any solid material capable of firmly gripping a ring 20 such as metal. Slots 15 for receiving the discs 50 may be cut into an existing fixture 10, or a fixture 10 with pre-cut slots 15 may be provided.

Figure 3:
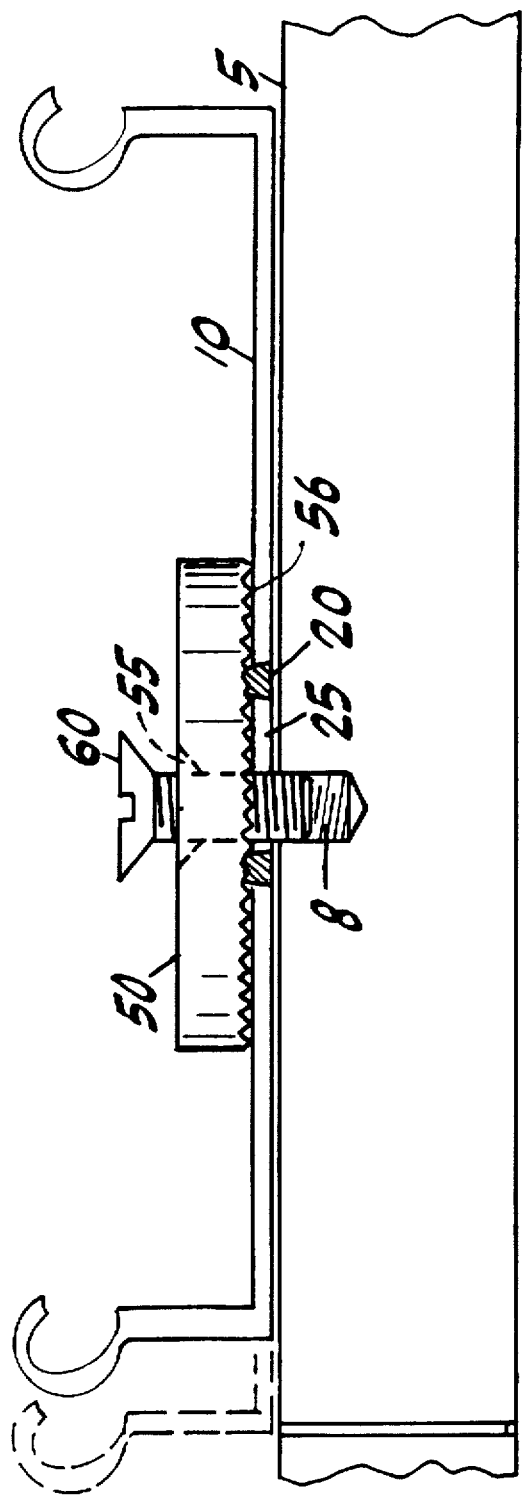
FIG. 3 is a side view of an embodiment of the apparatus of FIG. 1 with the fixture in an adjustable state.
Figure 4:
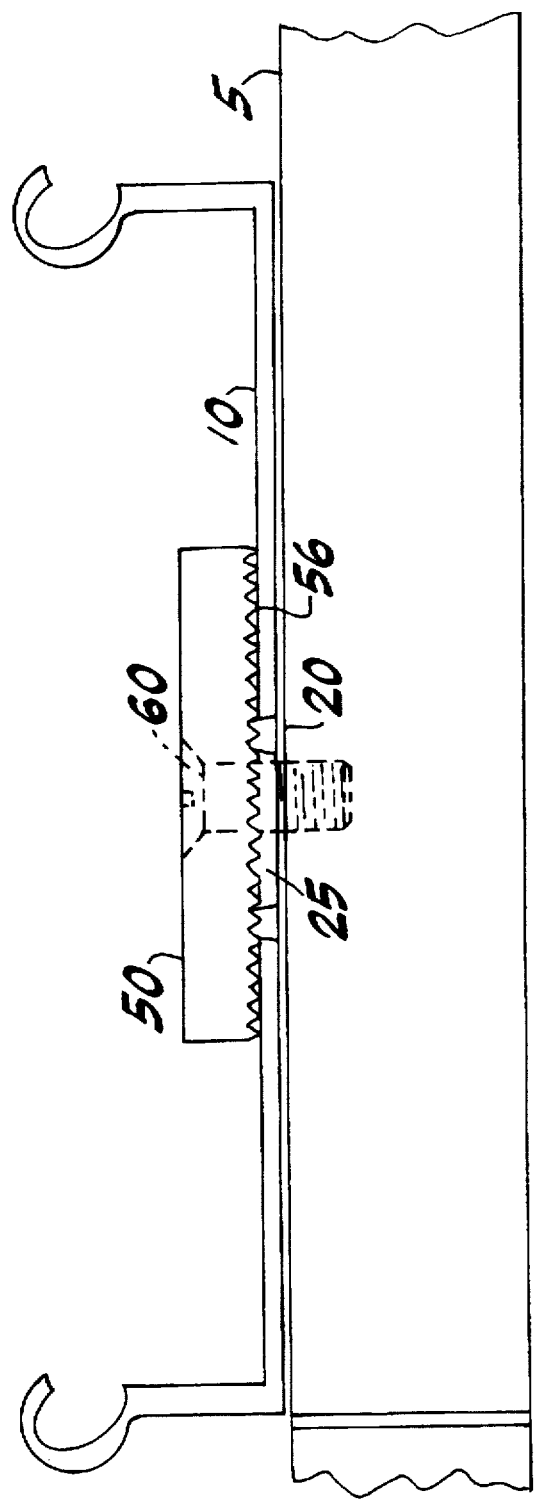
FIG. 4 is a side view of an embodiment of the apparatus of FIG. 1 with the fixture in a secured state.

FIG. 3 shows another embodiment of the present invention with one ring 20 installed in the fixture 10, and the screw 60, disc 50 and mounting surface 5 in an uncombined state. As shown in FIG. 4, the screw 60 is installed through the center opening 55 of the disc 50, then inserted through the opening 25 in the ring 20 into a pre-drilled hole 8 in the surface 5. The mounting fixture 10 may be adjusted to a desired position relative to the mounting surface 5 prior to tightening the screw 60 or screws. The maximum distance of such adjustment is confined by the greatest dimension of the opening 25 in the ring 20. If more than one ring 20 is employed, then the greatest dimension of the center opening 25 of the ring 20 is the maximum distance of adjustment of the fixture 10 relative to the mounting surface 5.

Figure 5:
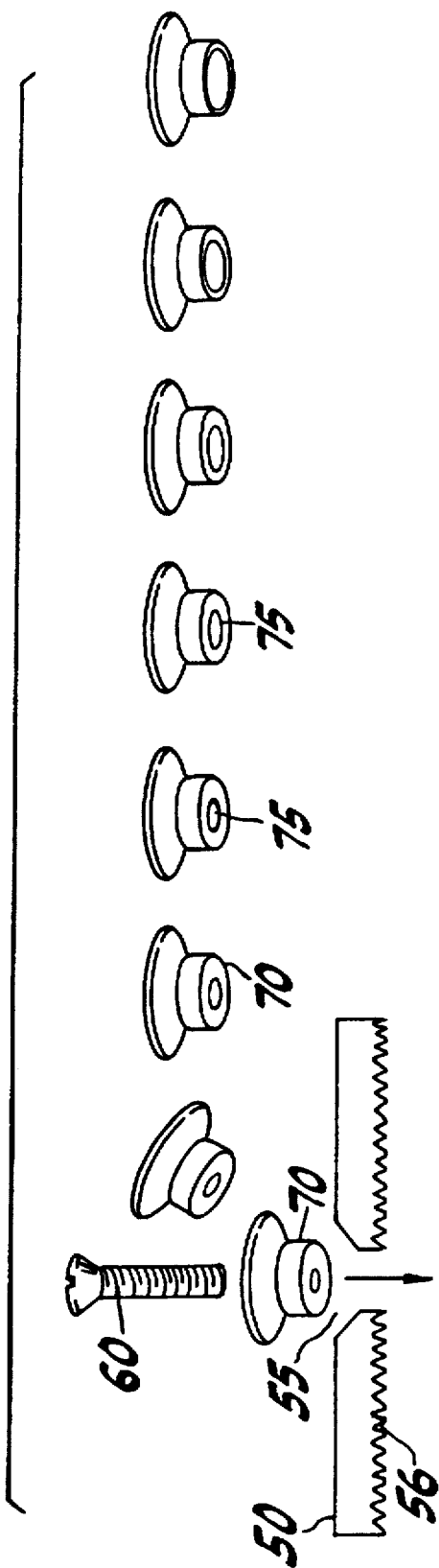
FIG. 5 is a side view of an embodiment of a disc with various graduated inserts to accommodate different sized fastening devices.

As shown in FIG. 5, a plurality of graduated inserts 70 for insertion into the center opening 55 of each disc 50 may be provided. The graduated inserts 70 have center openings 75 having different dimensions to accommodate the insertion of different sized fastening devices such as screws 60, bolts or nails. The opening 55 in each disc 50 may be countersunk, which is a generally conical shape for closely receiving screws 60 or graduated inserts 70 having tapered heads.

Once the desired position of the fixture 10 is obtained, the screw 60 is tightened into the pre-drilled hole 8 in the mounting surface 5 until the toothed underside surface 56 of the disc 50 contacts and fixedly engages the ring 20 and the fixture 10 in the desired position relative to the mounting surface 5. FIG. 4 shows the assembly with the fixture 10 secured against the mounting surface 5.

Figure 6:
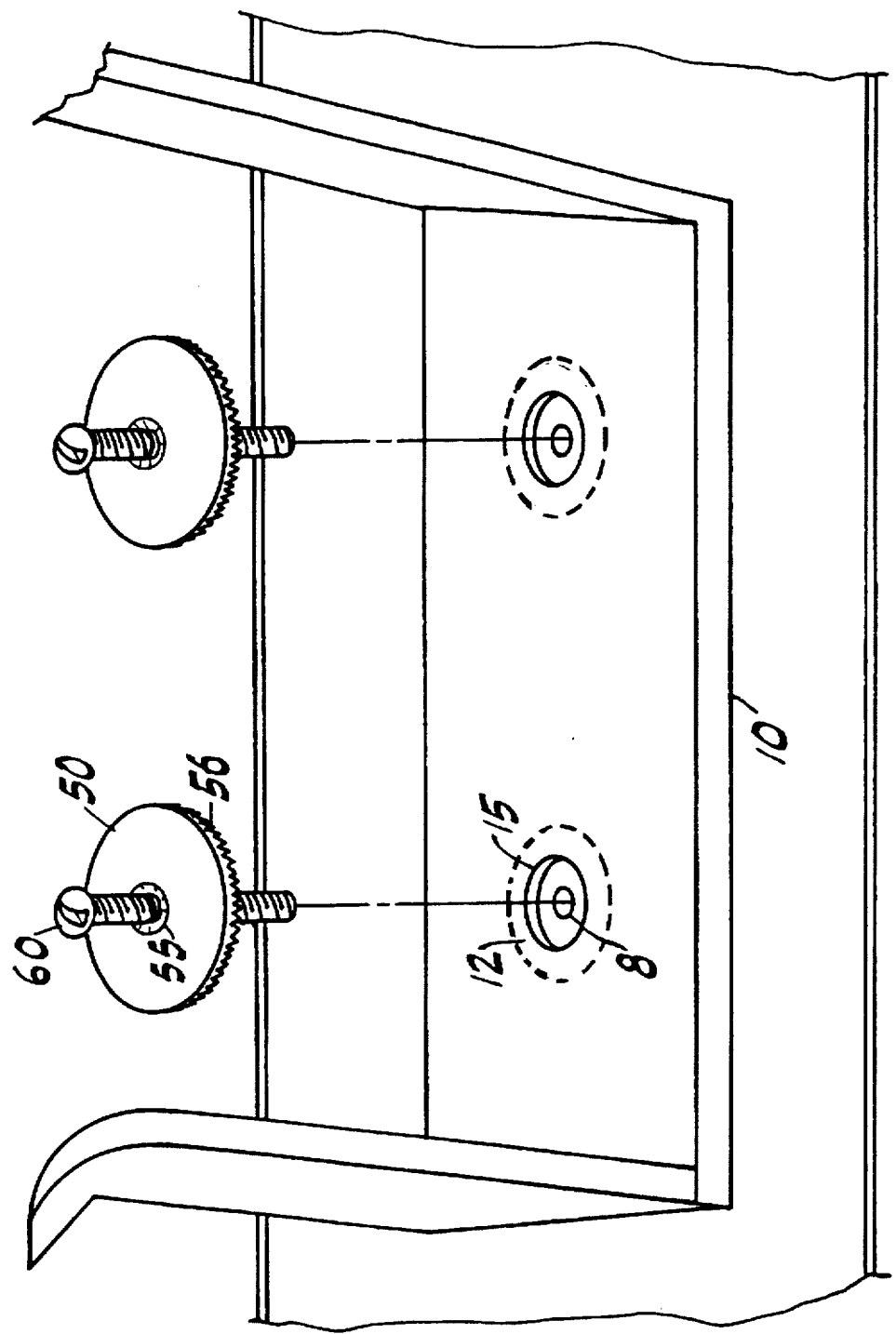
FIG. 6 is an overhead view of an embodiment of the apparatus of FIG. 1 with a raised surface formed around the perimeter of each slot in the fixture substituted for each ring.

In an alternate embodiment of the invention shown in FIG. 6, a fixture 10 for mounting is provided. The fixture may be made of a solid but malleable material such as metal or plastic. Slots 15 are punched into the fixture 10 such that a raised surface 12 is formed around the perimeter of each slot 15 by the bunching of the fixture material. The raised surface 12 around each slot 15 may also be formed by other methods such as molding or welding. As in the preferred embodiment of the invention shown in FIG. 1, a fastening device such as a screw 60 is inserted through the opening 55 in each disc 50. The raised surface 12 around each slot 15 substitutes for the ring provided in the preferred embodiment of the invention by providing a surface to which the conditioned underside 56 of each disc 50 can be securely fastened.

Though the present invention has been described with reference to specific embodiments selected for the purpose of illustration, it should be understood that numerous modifications could be applied by those skilled in the art without departing from the basic concept and scope of the present invention.

What is claimed is:

1. A mounting fixture supported on a mounting surface having an apparatus positioning and mounting said fixture, wherein the fixture is adjustable relative to the mounting surface, the mounting surface having at least one hole receiving a fastening device, said apparatus comprising:

a) at least one ring being fittedly inserted into an opening in the fixture, said ring having a thickness greater than said fixture whereby a raised surface extends above the plane of said fixture, said ring further comprising an opening within which the fastening device radially adjustable relative to the mounting surface; and b) at least one disc securedly engaging a respective one of said raised surface of said at least one ring and said fixture, wherein each disc has an opening receiving the fastening device, and an upper surface and a lower surface.

2. The apparatus for positioning and mounting fixtures of claim 1, wherein the fastening device is a screw.

3. The apparatus for positioning and mounting fixtures of claim 1, wherein the fastening device is a bolt.

4. The apparatus for positioning and mounting said fixture of claim 1, wherein the conditioned surface is toothed.

5. The apparatus for positioning and mounting fixtures of claim 1, wherein each disc is metal.

6. The apparatus for positioning and mounting fixtures of claim 1, wherein each ring is plastic.

7. The apparatus for positioning and mounting fixtures of claim 1, wherein each ring is metal.

8. The apparatus for positioning and mounting fixtures of claim 1, wherein the upper surface of each ring is generally convex for securedly engaging each disc.

9. The apparatus for positioning and mounting fixtures of claim 1, wherein each ring has a round circumference.

10. The apparatus for positioning and mounting fixtures of claim 1, wherein each ring has a square perimeter.

11. The apparatus for positioning and mounting fixtures of claim 1, wherein each ring has a clover-shaped perimeter.

12. The apparatus for positioning and mounting fixtures of claim 1, further including a mounting fixture having a slot for closely receiving each ring.

13. The apparatus positioning and mounting fixtures of claim 1, further including a plurality of graduated inserts for close insertion into the opening in each disc, each graduated insert having a center opening, each center opening having a different dimension for receiving fastening devices of differing dimensions.

14. The apparatus positioning and mounting said fixture of claim 13, wherein the opening in each disc is countersunk and the graduated inserts are adapted for fitted insertion into the countersunk center opening.

15. A mounting fixture supported on a mounting surface having an apparatus positioning and mounting said fixture, wherein the fixture is adjustable relative to the mounting surface, the mounting surface having at least one hole receiving a fastening device, comprising:

a) at least one slot having a raised perimeter formed around the slot that extends above the plane of said fixture within which the fastening device is radially adjustable relative to the mounting surface; and b) at least one disc securedly engaging a respective one of said raised perimeter of said at least one slot, wherein each disc has an opening receiving the fastening device, and an upper and a lower surface.

16. The apparatus for positioning and mounting fixtures of claim 15, wherein the lower surface of each disc is conditioned for gripping of the respective ring.

17. The apparatus for positioning and mounting fixtures of claim 15, wherein each slot has a round circumference.

18. The apparatus for positioning and mounting fixtures of claim 15, further including a plurality of graduated inserts for close insertion into the opening in each disc, each graduated insert having a center opening, each center opening having a different dimension for receiving fastening devices of differing dimensions.

19. The apparatus for positioning and mounting fixtures of claim 18, wherein the opening in each disc is countersunk and the graduated inserts are adapted for fitted insertion into the countersunk opening.

20. The apparatus for positioning and mounting a fixture of claim 1, wherein the lower surface of each disc is conditioned for gripping of the respective ring.

21. The apparatus for positioning and mounting fixtures of claim 16, wherein the conditioned surface is toothed.

* * * * *